V. E. AUGER.
PROCESS OF MANUFACTURING CHLOROBENZENE.
APPLICATION FILED FEB. 29, 1916.
1,180,964.  Patented Apr. 25, 1916.
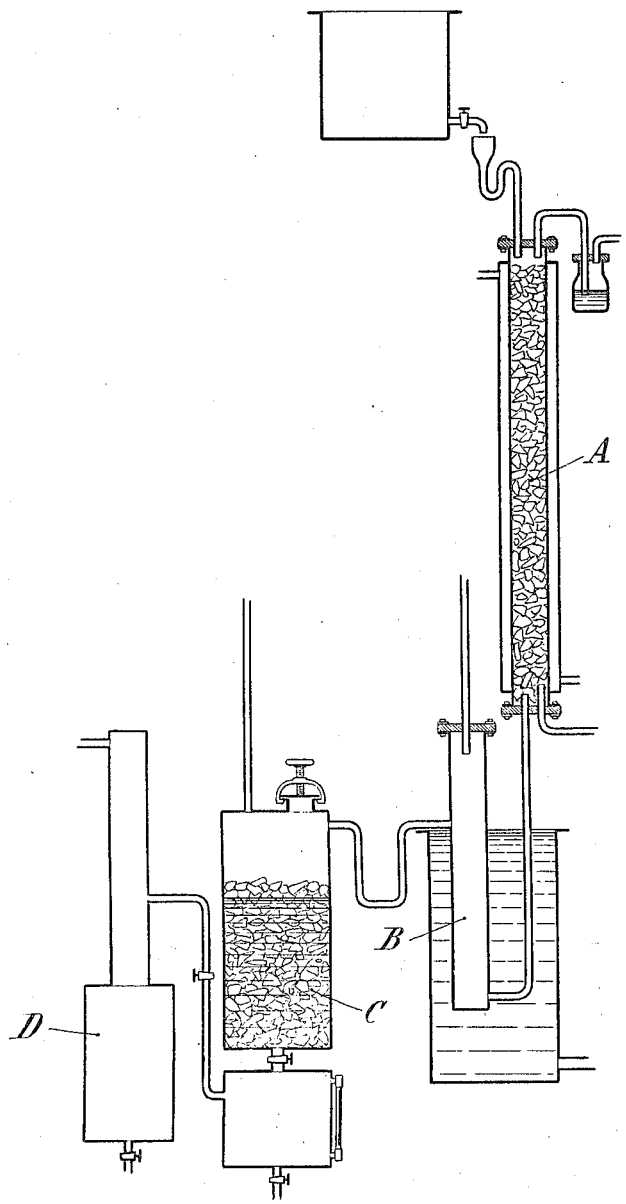

UNITED STATES PATENT OFFICE.

VICTOR EMILE AUGER, OF PARIS, FRANCE.

PROCESS OF MANUFACTURING CHLOROBENZENE.

1,180,964.  Specification of Letters Patent.  Patented Apr. 25, 1916.

Application filed February 29, 1916. Serial No. 81,173.

*To all whom it may concern:*

Be it known that I, VICTOR EMILE AUGER, citizen of the Republic of France, resident of 25 Rue Humboldt, Paris, in the said Republic, professor, have invented certain new and useful Improvements in Processes of Manufacturing Chlorobenzene; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is well known that benzene becomes directly chlorated when it is heated together with perchlorid of iron, or else under the action of chlorin in the presence of aluminium chlorid, or under the action of a current of chlorin on a solution of perchlorid of iron in benzene in the presence of iron (German Patent No. 219,242, to Saccharinfabrik Aktiengesellschaft vorm. Fahlberg List & Co., dated October 5th 1907).

My invention relates to a new continuous method of manufacturing chlorobenzene which consists in saturating the benzene with chlorin and causing the solution thus obtained and which is of substantially constant strength to pass into a column containing iron shavings. The reaction is immediate: the hydrochloric acid is developed and chlorobenzene obtained. I have found that this process gives the best output in practice. Both chlorobenzene and polychlorated products are obtained. The liquid issuing from the apparatus contains about 30% of chlorobenzene and the ratio of chlorobenzene relatively to the polychlorated products is as follows: chlorobenzene, 100; polychlorated products, 6.

The process is suitably conducted in an apparatus which is diagrammatically shown in vertical section in the drawing.

The working of the process is as follows: Gaseous chlorin, which does not need to be absolutely dry, is admitted at the bottom of a cooled column A, containing silicious stones onto which streams of benzene are caused to fall. The internal lining of the column is made of lead; as shown, the column is provided with an indicator which permits to adjust the afflux of benzene so as to have it saturated with chlorin. The solution thus obtained automatically passes into a cast iron column B filled with iron shavings and externally cooled. The solution of chlorin in benzene is admitted at the bottom of the column; the reaction is immediate: the hydrochloric gas is developed and the liquid resulting from the reaction goes out by an overflow opening provided at the three quarters of the height of the column. The mixture of benzene, chlorobenzene, hydrochloric acid and iron chlorid passes into a column C containing carbonate of lime moistened with water, in which it is deprived of its iron and hydrochloric acid. Chlorobenzene is separated from the benzene and polychlorated products by means of a fractional distillation in the distilling apparatus D.

Having now particularly described and ascertained the nature of my said invention and the best means I know of carrying the same into practice, I claim:

1. A continuous process for manufacturing chloro-benzene, which comprises dissolving chlorin in benzene and then causing the solution so obtained to act on iron.

2. A continuous process for manufacturing chlorobenzene, which comprises forming a solution of constant strength of benzene containing chlorin dissolved therein and causing the solution to act on iron to form chloro-benzene.

3. A continuous process for manufacturing chloro-benzene, which comprises forming a solution of chlorin in benzene by causing benzene and chlorin to flow in a contacting counter current, and discharging the resulting liquid into a container containing iron.

4. A continuous process for manufacturing chloro-benzene, which comprises dissolving chlorin in benzene, causing the solution so obtained to act on iron, removing the hydrochloric acid and chlorid of iron from the resulting solution and finally fractionating the resulting liquid to obtain chloro-benzene.

5. A continuous process for manufacturing chloro-benzene, which comprises forming a solution of chlorin in benzene by causing benzene and chlorin to flow in a contacting counter current, discharging the resulting liquid into a container containing iron, removing the hydrochloric acid and chlorid of iron and finally distilling the resulting liquid to obtain chloro-benzene.

In testimony that I claim the foregoing as my invention, I have signed my name in presence of two subscribing witnesses.

VICTOR EMILE AUGER.

Witnesses:
CHAS. P. PRESSLY,
CHARLES EUGÉNE ARSI.